United States Patent
Lee et al.

(10) Patent No.: US 8,018,180 B2
(45) Date of Patent: Sep. 13, 2011

(54) BACKLIGHT MODULE FOR LCD DEVICE

(75) Inventors: Tsung-Shiun Lee, Hsin-Chu (TW);
Kuo-Yu Hsiung, Hsin-Chu (TW);
Sheng-Wen Huang, Hsin-Chu (TW);
Chi-Ming Lo, Hsin-Chu (TW)

(73) Assignee: AU Optronics Corp., Science-Based Industrial Park, Hsin-Chu (TW)

(*) Notice: Subject to any disclaimer, the term of this patent is extended or adjusted under 35 U.S.C. 154(b) by 247 days.

(21) Appl. No.: 12/509,500

(22) Filed: Jul. 27, 2009

(65) Prior Publication Data
US 2010/0283402 A1    Nov. 11, 2010

(30) Foreign Application Priority Data
May 8, 2009  (TW) ............................. 98115289 A

(51) Int. Cl.
*H01J 1/53*    (2006.01)

(52) U.S. Cl. ...................................... 315/291; 345/204

(58) Field of Classification Search .................. 315/291, 315/293, 294, 297, 312; 345/102, 204
See application file for complete search history.

(56) References Cited

U.S. PATENT DOCUMENTS

| | | | |
|---|---|---|---|
| 7,314,304 B2* | 1/2008 | Ahn et al. | 362/631 |
| 7,638,754 B2* | 12/2009 | Morimoto et al. | 250/226 |
| 7,659,879 B2* | 2/2010 | Han et al. | 345/102 |
| 7,812,810 B2* | 10/2010 | Kim et al. | 345/102 |
| 7,834,559 B2* | 11/2010 | Hsu et al. | 315/277 |
| 2007/0190890 A1 | 8/2007 | Hsu | |
| 2007/0298662 A1 | 12/2007 | Kim | |
| 2008/0080182 A1 | 4/2008 | Yang et al. | |
| 2008/0166930 A1 | 7/2008 | Nelson | |
| 2009/0189537 A1* | 7/2009 | Hong | 315/291 |

* cited by examiner

*Primary Examiner* — Don Le
(74) *Attorney, Agent, or Firm* — Winston Hsu; Scott Margo

(57) ABSTRACT

A backlight module includes a connector capable of performing voltage conversion or a voltage converter capable of transmitting signals. The connector or the voltage converter, disposed between an inverter and a lamp set, receives low-voltage signals generated by the inverter, performs voltage conversion, and outputs high-voltage signals for driving the lamp set.

18 Claims, 9 Drawing Sheets

_US 8,018,180 B2_

BACKLIGHT MODULE FOR LCD DEVICE

BACKGROUND OF THE INVENTION

1. Field of the Invention

The present invention is related to a backlight module, and more particularly, to a backlight module using a connector with voltage-conversion function or a step-up module with signal transmitting function.

2. Description of the Prior Art

Liquid crystal display (LCD) devices, characterized in low radiation, small size and low power consumption, have gradually replaced traditional cathode ray tube displays (CRTs) and been widely used in electronic devices, such as notebook computers, personal digital assistants (PDAs), flat-panel televisions or mobile phones. As a key component in the LCD device, the backlight module is normally disposed directly underneath the LCD panel or along the sides at the rear of the LCD panel. Using lamps and various optical devices (such as diffusion plates or prisms), high-luminous and uniform light source can be provided.

The basic operation of the backlight module is to provide an output signal for driving the lamps according to an input signal. The input signal is provided by the direct-current (DC) power transmitted from the driving circuit of the LCD device, and its initial voltage level is insufficient for driving the lamps. Therefore, voltage-conversion is performed by the step-up circuit of the inverter, thereby generating the high-voltage signal for driving the lamps. The inverter is disposed on a printed circuit board (PCB). In order for the inverter to transmit the high-voltage signal to the lamps, the lamp electrodes, the connector and high-voltage wires are welded on the PCB, which makes the assembly process very time- and effort-consuming.

Referring to FIG. 1, which is a diagram illustrating a prior art backlight module 10. The backlight module 10 includes an inverter 110, a lamp set 120, and a socket-type connector 100. The inverter 110 includes a control circuit 112, a power converter 114 and a step-up device 116. The control circuit 112 can generate a control signal $V_S$ corresponding to each lamp in the lamp set 220 according to a DC signal $V_{DC}$ transmitted from the driving circuit of the LCD device. The power converter 114 can output a symmetrical low-voltage variable duty signal $V_{DUTY}$ by converting the DC signal $V_{DC}$, whose voltage level and vibration amplitude are then enhanced by the step-up device 116 in order to output a corresponding high-voltage signal $V_{LAMP}$. When assembling the backlight module 10, the inverter 110 and the lamp set 120 can be directly inserted into the slots of the socket-type connector 100 so that the high-voltage signal $V_{LAMP}$ generated by the inverter 110 can be transmitted to the lamp set 120.

Compared to the traditional welding technique, the prior art socket-type connector 100 enhances the efficiency of the assembly process. However, assembly personnel face the danger of contacting the high-voltage output end of the inverter 110. To prevent deadly electric shock, high-voltage insulating structure needs to be adopted, which requires large-size PCB. Also, the inverter 110 needs to include the step-up device 116 for voltage-conversion, which also occupies large space. Therefore, the prior art socket-type connector 100 fails to meet the demands when developing thinner LCD devices.

SUMMARY OF THE INVENTION

The present invention includes a connector with voltage-converting function for electrically connecting a driving device to a load. The connector comprises a voltage-converting module for performing voltage-conversion on a first voltage generated by the driving device and thereby generating a corresponding second voltage for driving the load, the voltage-converting module including an input end for receiving the first voltage; and an output end for outputting the second voltage; a first connecting device disposed at a first side of the connector and connected to the input end of the voltage-converting module for accommodating the driving device and transmitting the first voltage; and a second connecting device disposed at a second side of the connector and connected to the input end of the voltage-converting module for accommodating the load and transmitting the second voltage to the load.

The present invention further includes a voltage converter for connecting a driving device to a load. The voltage converter comprises a voltage-converting module for performing voltage-conversion on a first voltage generated by the driving device and thereby generating a corresponding second voltage for driving the load, the voltage-converting module including an input end for receiving the first voltage; and an output end for outputting the second voltage; and a bobbin for containing the voltage-converting module and comprising a first slot located at a first side of the voltage converter for allowing the driving device to be in contact with the input end of the voltage-converting module; and a second slot located at a second side of the voltage converter for allowing the load to be in contact with the output end of the voltage-converting module.

The present invention further includes a backlight module comprising an inverter for providing a first voltage; a lamp for providing light according to a second voltage; and a connector with voltage-converting function for electrically connecting the inverter to the lamp. The connector comprises a voltage-converting module for performing voltage-conversion on the first voltage and thereby generating the corresponding second voltage for driving the lamp, the voltage-converting module including an input end for receiving the first voltage; and an output end for outputting the second voltage; a first connecting device disposed at a first side of the connector and connected to the input end of the voltage-converting module and the inverter for accommodating the inverter and transmitting the first voltage; and a second connecting device disposed at a second side of the connector and connected to the output end of the voltage-converting module and the lamp for accommodating the lamp and transmitting the second voltage to the lamp.

The present invention further includes a backlight module comprising an inverter for providing a first voltage; a lamp for providing light according to a second voltage; and a voltage converter for connecting the inverter to the lamp. The voltage converter comprises a voltage-converting module for performing voltage-conversion on the first voltage and thereby generating the corresponding second voltage for driving the lamp, the voltage-converting module including an input end for receiving the first voltage; and an output end for outputting the second voltage; and a bobbin for containing the voltage-converting module and comprising a first slot located at a first side of the voltage converter for allowing the inverter to be in contact with the input end of the voltage-converting module; and a second slot located at a second side of the voltage converter for allowing the lamp to be in contact with the output end of the voltage-converting module.

These and other objectives of the present invention will no doubt become obvious to those of ordinary skill in the art after

DETAILED DESCRIPTION

Figure 1:
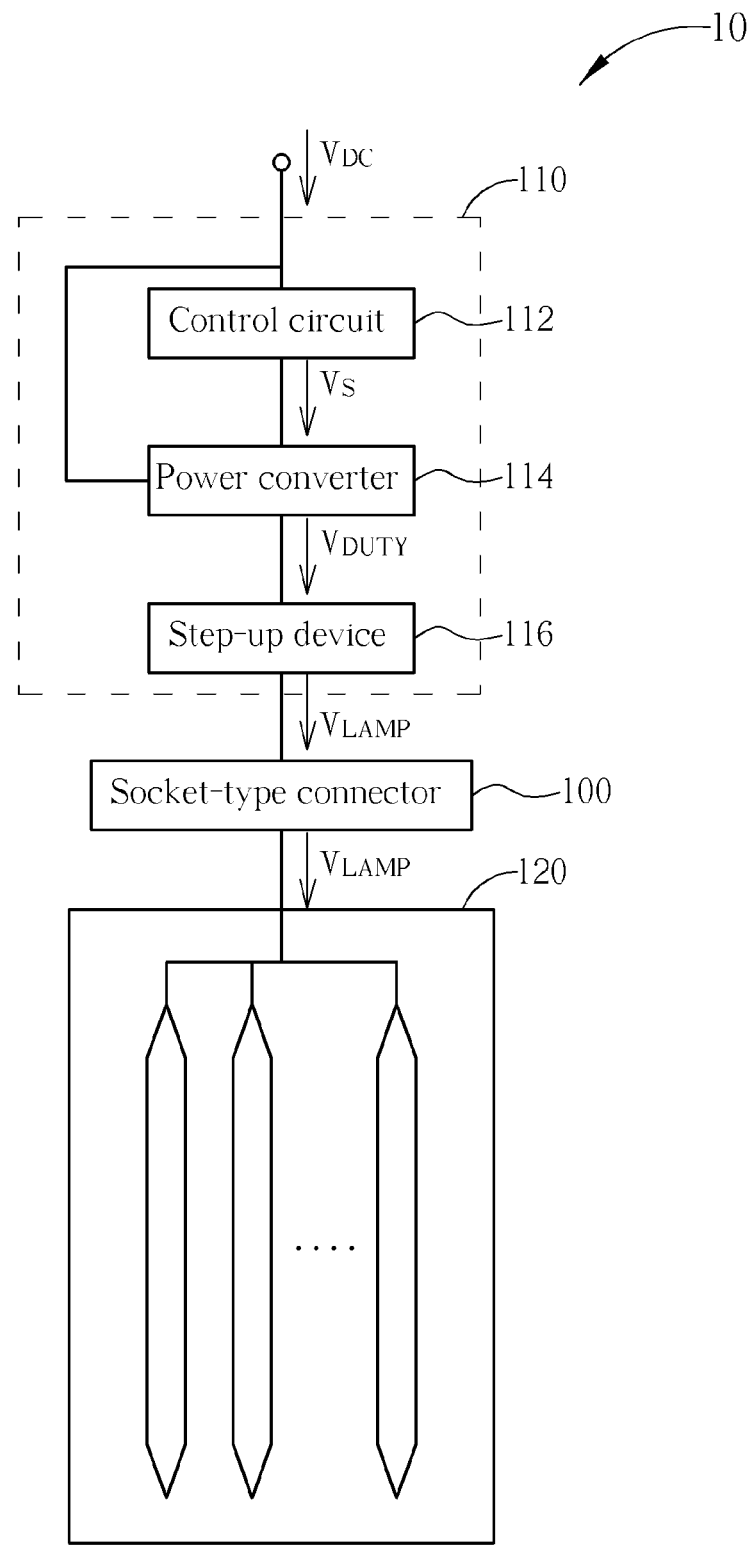
FIG. 1 is a diagram illustrating a prior art backlight module.
Figure 2:
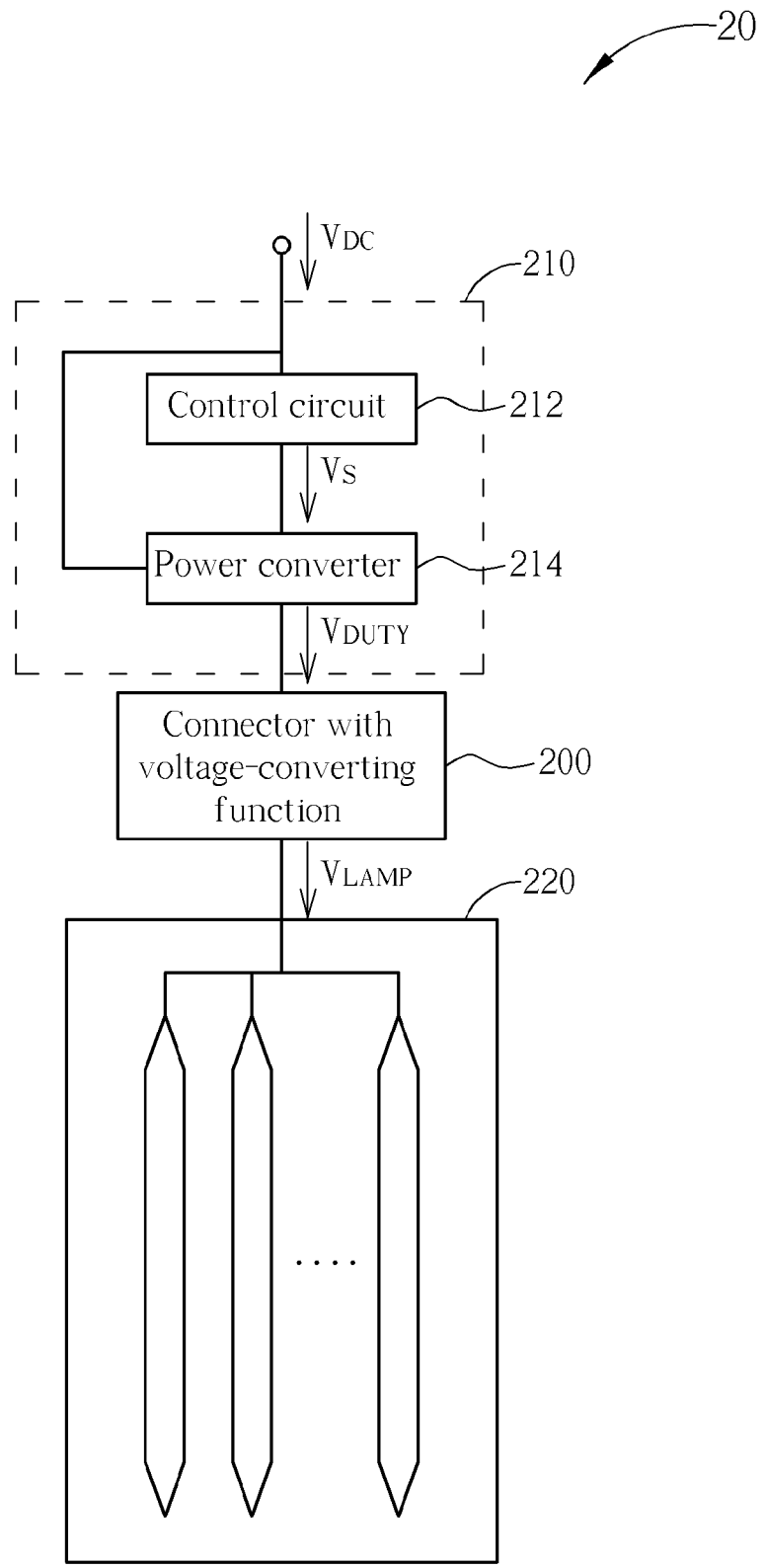
FIG. 2 is a functional diagram illustrating a backlight module according to a first embodiment of the present invention.

Referring to FIG. 2, which is a functional diagram illustrating a backlight module 20 according to a first embodiment of the present invention. The backlight module 20 includes an inverter 210, a lamp set 220, and a connector 200 with voltage-conversion function. The inverter 210 includes a control circuit 212 and a power converter 214. The control circuit 212 can generate a control signal $V_S$ corresponding to each lamp in the lamp set 220 according to a DC signal $V_{DC}$ transmitted from the driving circuit of the LCD device. The power converter 214 can output a symmetrical low-voltage variable duty signal $V_{DUTY}$ by converting the DC signal $V_{DC}$. The inverter 210, normally manufactured on a PCB, can output the variable duty signal $V_{DUTY}$ via a plurality of signal output ends. The connector 200 with voltage-conversion function includes a plurality of connecting units capable of enhancing the voltage level and vibration amplitude of the variable duty signal $V_{DUTY}$ in order to output a corresponding high-voltage signal $V_{LAMP}$ for driving corresponding lamps in the lamp set 220. In the first embodiment of the present invention, the variable duty signal $V_{DUTY}$ can be transmitted to corresponding connecting units of the connector 200 via the plurality of signal output ends. The connecting units of the connector 200 can then transmit the high-voltage signal $V_{LAMP}$ to corresponding lamps in the lamp set 220. The amount of the signal output ends and the connecting units can be determined by the amount of lamps in the lamp set 220.

Figure 3:
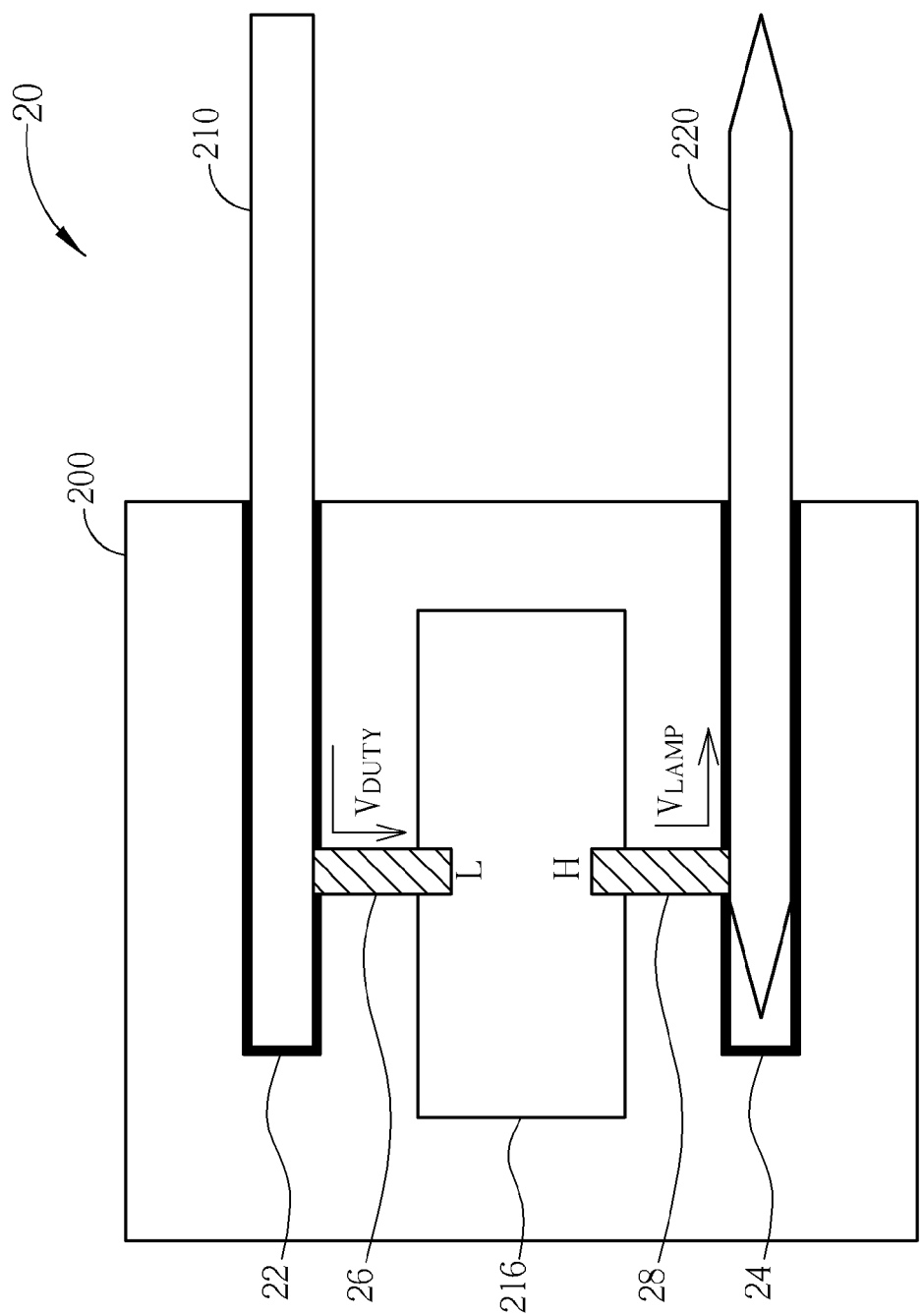
FIG. 3 is a diagram illustrating the connector with voltage-conversion function according to the first embodiment of the present invention.

Referring to FIG. 3, which is a diagram illustrating the connector 200 with voltage-conversion function according to the first embodiment of the present invention. FIG. 3 shows one of the plurality of the connecting units, including two slots 22 and 24, two connecting devices 26 and 28, and a step-up device 216. The slot 22 can contain the PCB of the inverter 210, while the slot 24 can contain the electrode of the lamp set 220. The step-up device 216 can boost the low-voltage signal $V_{DUTY}$ received at an input end L and can then output the high-voltage signal $V_{LAMP}$ at an output end H. The connecting device 26 is disposed between the slot 22 and the input end L of the step-up device 216, while the connecting device 28 is disposed between the slot 24 and the output end H of the step-up device 216. The connecting devices 26 and 28 include conductive material and can be designed as a clip or multiple clips with various shapes.

When assembling the backlight module 20 according to the first embodiment of the present invention, the PCB of the inverter 210 can be inserted into the slot 22 in order for the corresponding signal output ends to be in contact with the connecting device 26, and the electrode of the lamp set 220 can be inserted into the slot 24 for contacting the connecting device 28. Therefore, the variable duty signal $V_{DUTY}$ generated by the inverter 210 can be transmitted to the input end L of the step-up device 216 in the connector 200 via the connecting device 26. After performing voltage-boosting, the step-up device 216 outputs the high-voltage signal $V_{LAMP}$ at the output end H, and then transmits the high-voltage signal $V_{LAMP}$ to the corresponding lamps in the lamp set 220 via the connecting device 28. Since the variable duty signal $V_{DUTY}$ outputted by the inverter 210 is a low-voltage signal, the safety of the assembly personnel can be secured by eliminating the possibility of contacting high voltages, and there is no need for bulky high-voltage insulating structure. On the other hand, since the backlight module 20 of the present invention performs voltage-boosting using the connector 200, the inverter 210 is not required to include step-up circuits. As a result, the size of the PCB can be reduced, thereby decreasing manufacturing costs and achieving device miniaturization.

Figure 4:
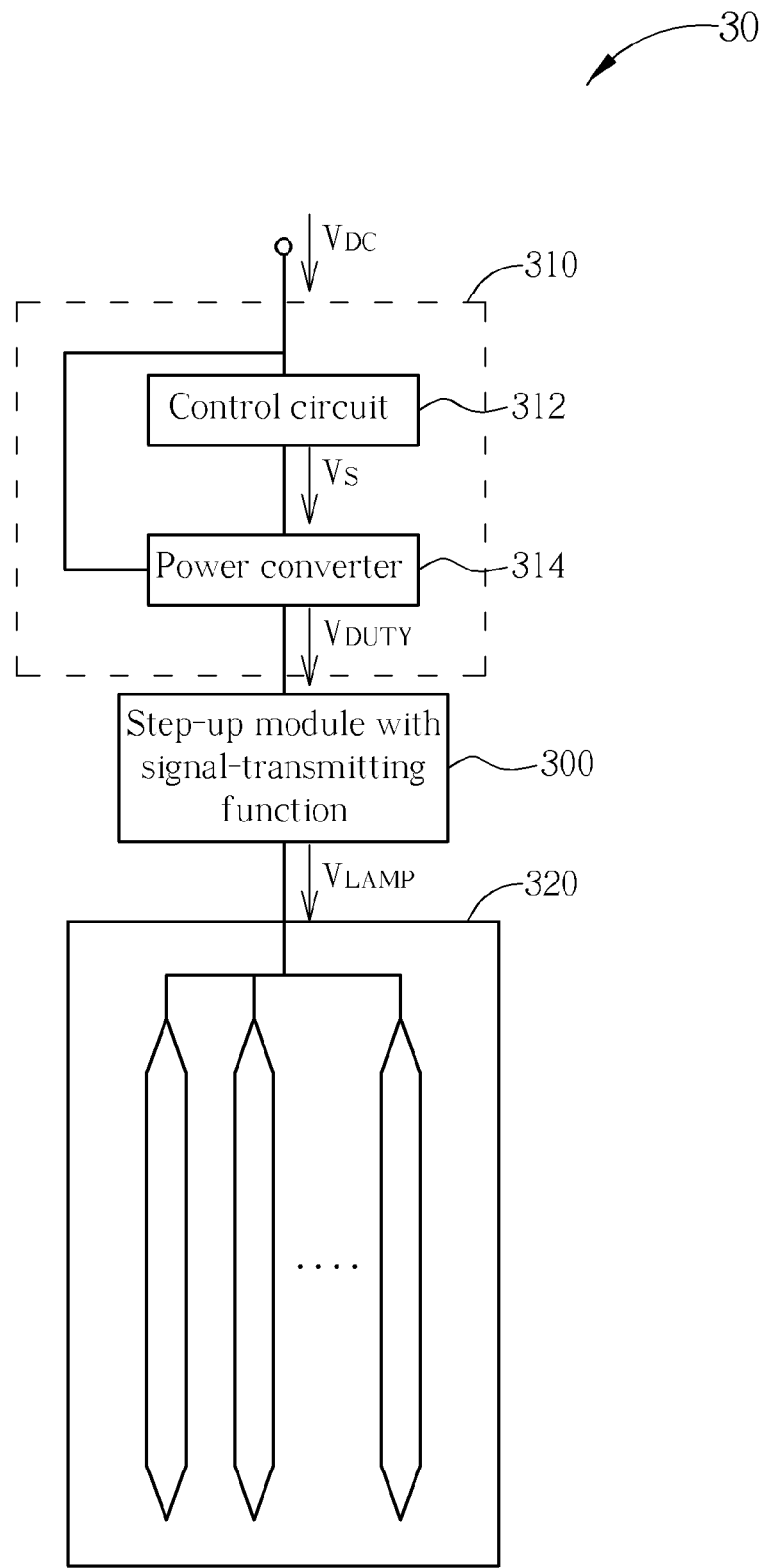
FIG. 4 is a functional diagram illustrating a backlight module according to a second embodiment of the present invention.

Referring to FIG. 4, which is a functional diagram illustrating a backlight module 30 according to a second embodiment of the present invention. The backlight module 30 includes an inverter 310, a lamp set 320, and a step-up module 300 with signal transmitting function. The inverter 310 includes a control circuit 312 and a power converter 314. The control circuit 312 can generate a control signal $V_S$ corresponding to each lamp in the lamp set 320 according to a DC signal $V_{DC}$ transmitted from the driving circuit of the LCD device. The power converter 314 can output a symmetrical low-voltage variable duty signal $V_{DUTY}$ by converting the DC signal $V_{DC}$. The inverter 310, normally manufactured on a PCB, can output the variable duty signal $V_{DUTY}$ via a plurality of signal output ends. The step-up module 300 with signal transmitting function includes a plurality of step-up units capable of enhancing the voltage level and vibration amplitude of the variable duty signal $V_{DUTY}$ in order output a corresponding high-voltage signal $V_{LAMP}$ for driving corresponding lamps in the lamp set 320. In the second embodiment of the present invention, the variable duty signal $V_{DUTY}$ can be transmitted to the corresponding step-up units of the step-up module 300 via the plurality of signal output ends. The step-up units of the step-up module 300 can then transmit the high-voltage signal $V_{LAMP}$ to corresponding lamps in the lamp set 320. The amount of the signal output ends and the step-up units can be determined by the amount of lamps in the lamp set 320.

Figure 5:
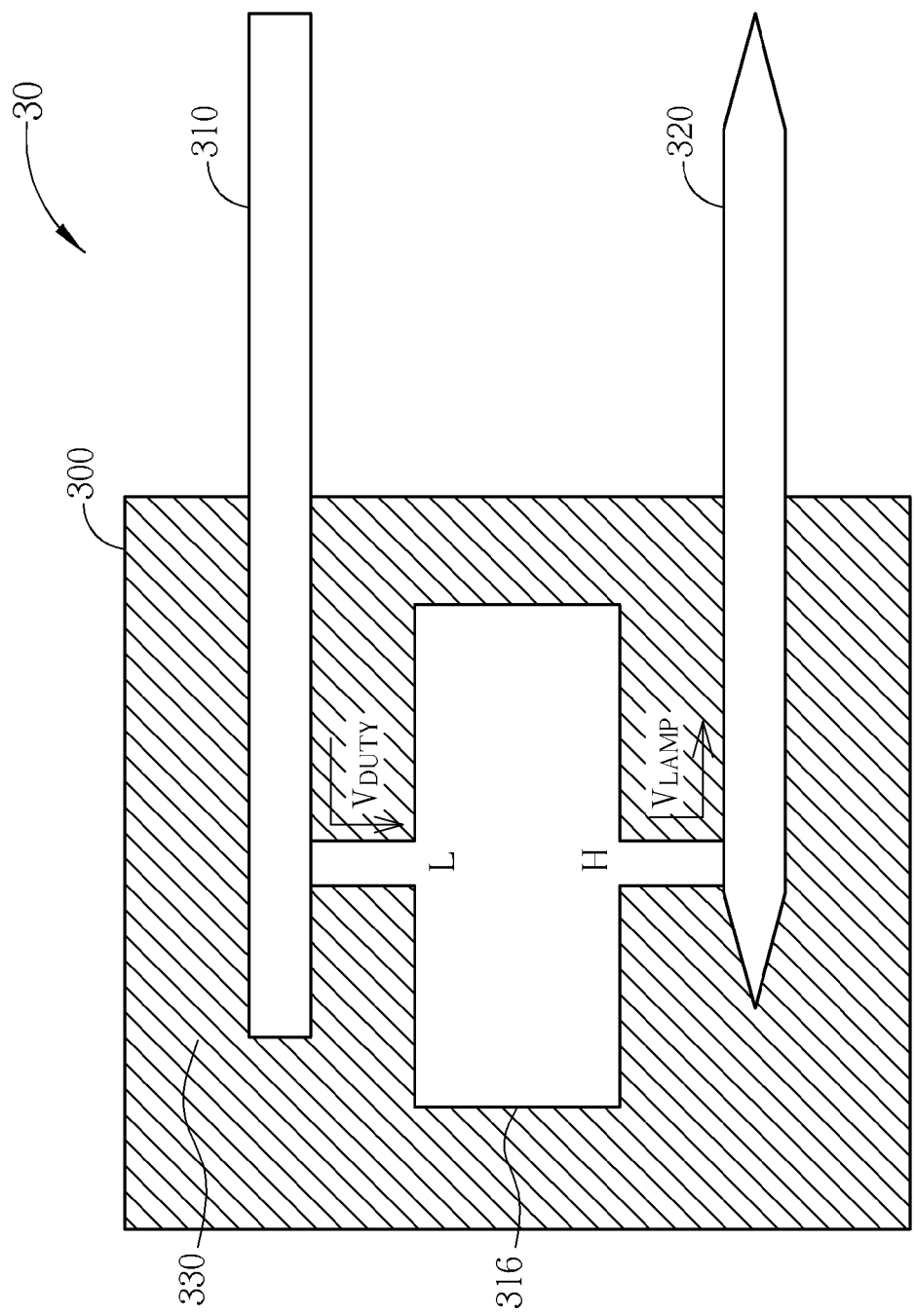
FIG. 5 is a diagram illustrating the step-up module with signal transmitting function according to the second embodiment of the present invention.

Referring to FIG. 5, which is a diagram illustrating the step-up module 300 with signal transmitting function according to the second embodiment of the present invention. FIG. 5 shows one of the plurality of step-up units, including a bobbin 330 and a step-up device 316. The step-up device 316 can boost the low-voltage signal $V_{DUTY}$ received at an input end L and can then output the high-voltage signal $V_{LAMP}$ at an output end H. The bobbin 330 can be shaped so as to accommodate the PCB of the inverter 310 and the electrode of the lamp set 320. Therefore, the PCB of the inverter 310 can be inserted into the bobbin 330 at one side so that the corresponding signal output end can be in contact with the input end L of step-up device 316, while the electrode of the lamp set 320 can be inserted into the bobbin 330 at the other side for contacting the output end H of step-up device 316.

When assembling the backlight module 30 according to the second embodiment of the present invention, the inverter 310 and the lamp set 320 can be inserted into the bobbin 330 of the step-up module 300 so that the variable duty signal $V_{DUTY}$ generated by the inverter 310 can be transmitted to the input end L of the step-up device 316 in the step-up module 300. After performing voltage-boosting, the step-up device 316 outputs the high-voltage signal $V_{LAMP}$ at the output end H, and then transmits the high-voltage signal $V_{LAMP}$ to the corresponding lamps in the lamp set 320. Since the variable duty signal $V_{DUTY}$ outputted by the inverter 310 is a low-voltage signal, the safety of the assembly personnel can be secured by eliminating the possibility of contacting high voltages, and there is no need for bulky high-voltage insulating structure. On the other hand, since the backlight module 30 of the present invention performs voltage-boosting using the step-up module 300, the inverter 310 is not required to include step-up circuits. As a result, the size of the PCB can be reduced, thereby decreasing manufacturing costs and achieving device miniaturization.

Figure 6:
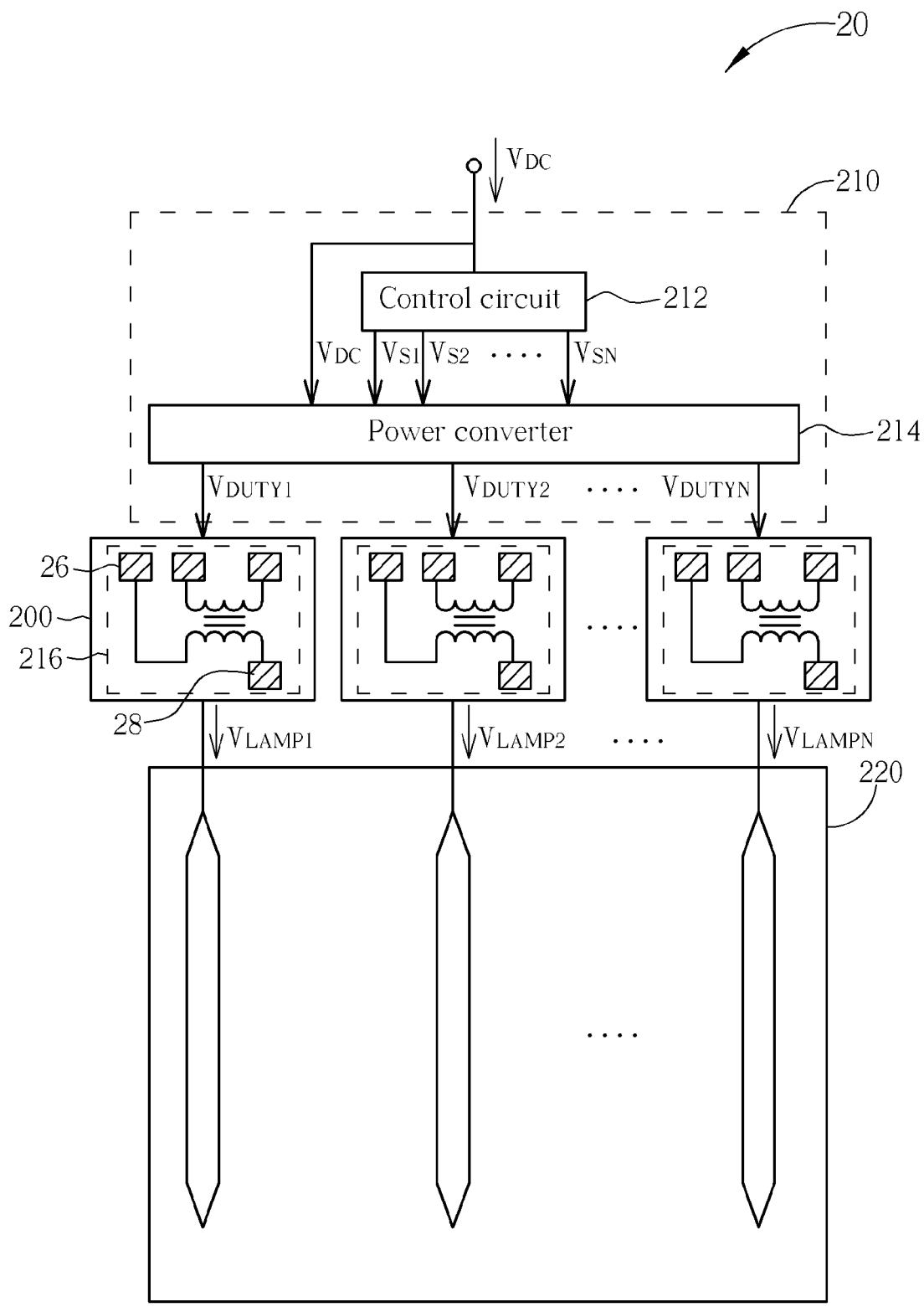
FIGS. 6 and 7 are diagrams illustrating the step-up device according to the first embodiment of the present invention.
Figure 7:
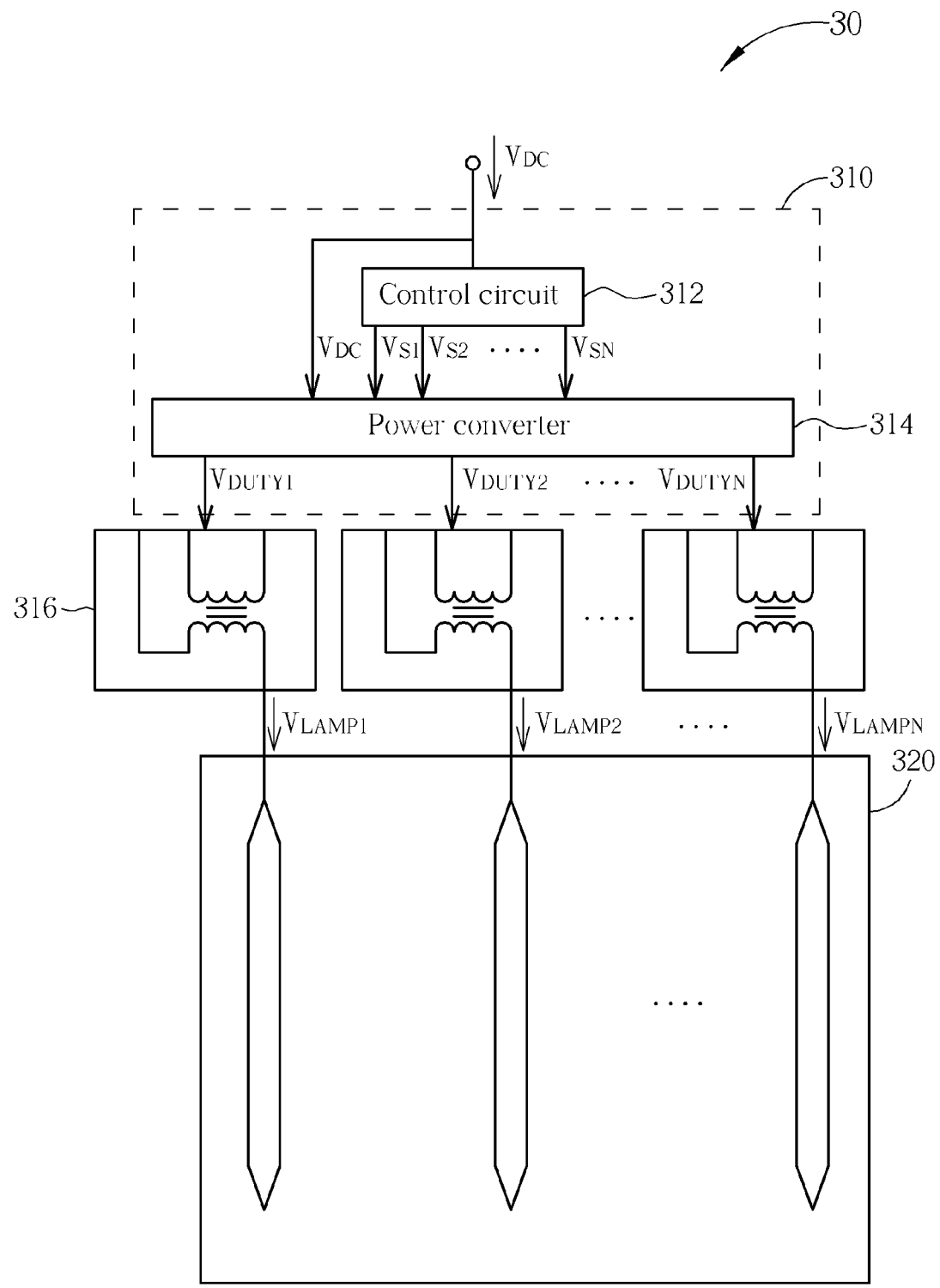
Figure 8:
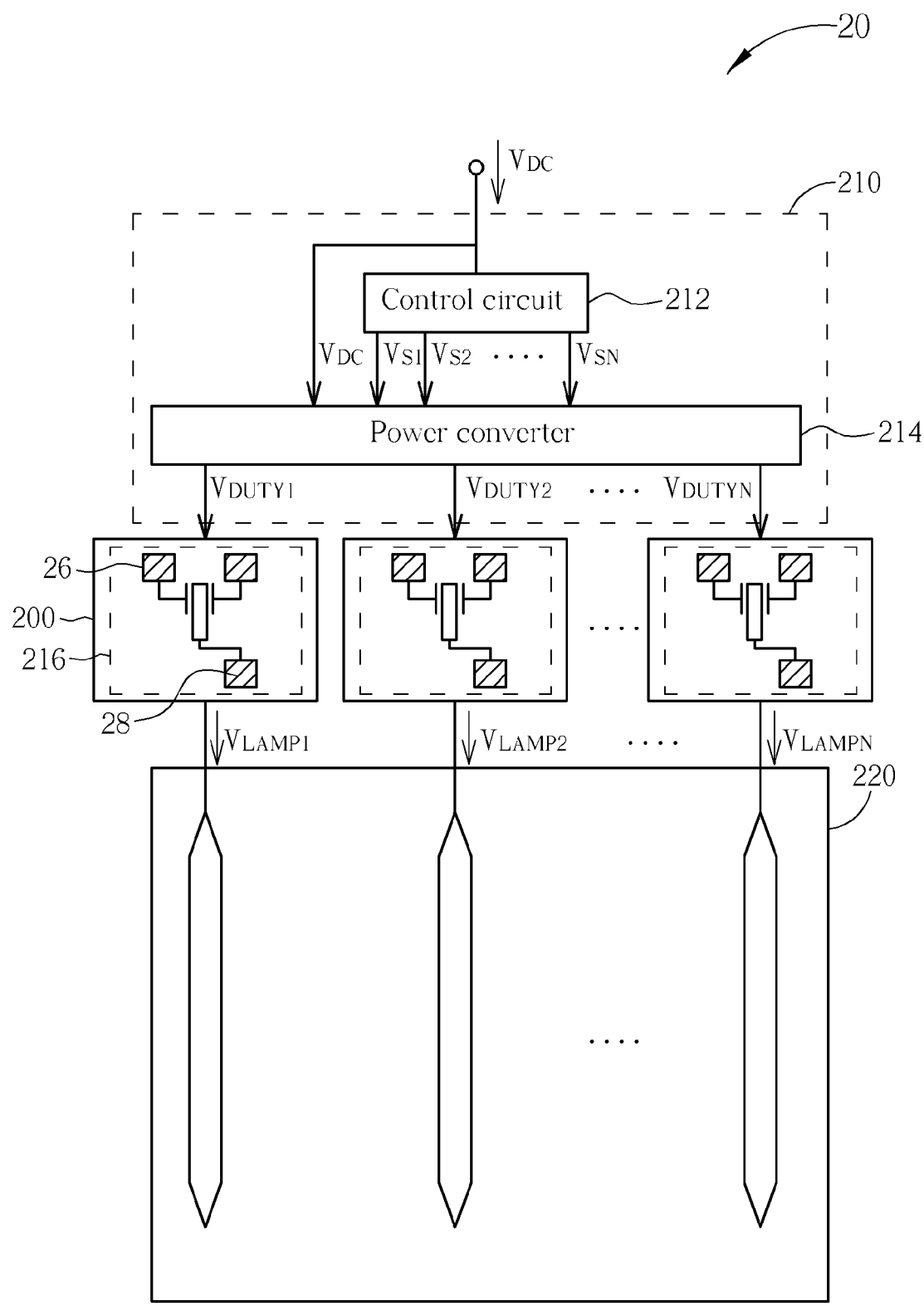
FIGS. 8 and 9 are diagrams illustrating the step-up device according to the second embodiment of the present invention.
Figure 9:
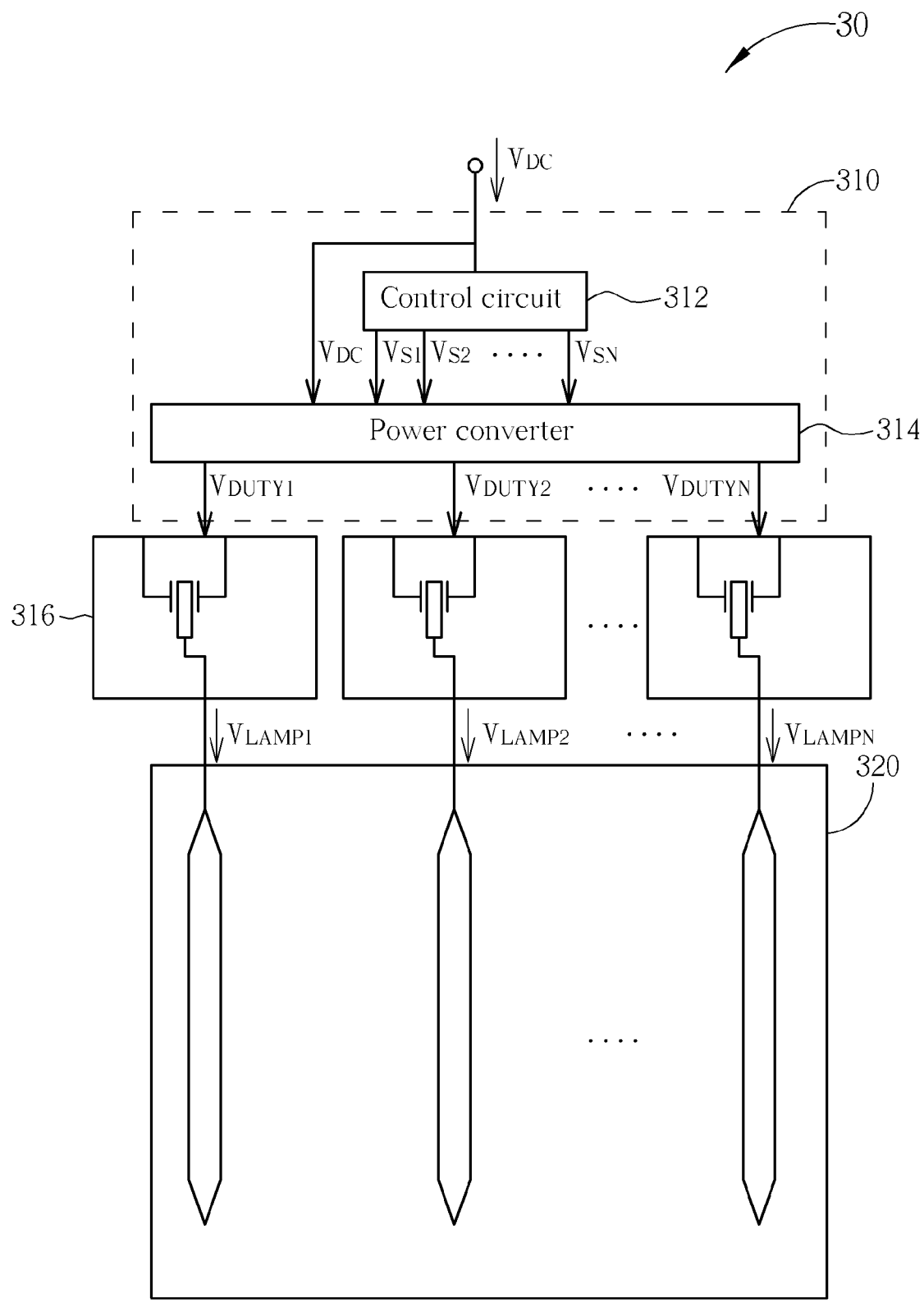

Referring to FIGS. 6-9, in which FIGS. 6 and 7 are diagrams illustrating the step-up device 216 according to the first embodiment of the present invention, while FIGS. 8 and 9 are diagrams illustrating the step-up device 316 according to the second embodiment of the present invention. The step-up devices depicted in FIGS. 6 and 8 adopt winding transformers, while those depicted in FIGS. 7 and 9 adopt piezoelectric transformers. Each of the lamp sets 230 and 320 includes N parallel lamps of the types including cold cathode fluorescent lamps (CCFLs), external electrode fluorescent lamps (EEFLs) or hot cathode fluorescent lamps (HCFLs), etc. However, the present invention can also adopt other types of step-up devices, or drive other types of lamps in the lamp sets.

In the backlight module of the present invention, the connector capable of performing voltage-conversion and the step-up module capable of transmitting signals can converter the low-voltage signal generated by the inverter into the high-voltage signal before transmitted to the lamp set. The safety of the assembly personnel can be secured by eliminating the possibility of contacting high voltages, and there is no need for bulky high-voltage insulating structure. The inverter of the present invention is not required to include step-up circuits. As a result, the size of the PCB can be reduced, thereby decreasing manufacturing costs and achieving device miniaturization.

Those skilled in the art will readily observe that numerous modifications and alterations of the device and method may be made while retaining the teachings of the invention.

What is claimed is:

1. A connector with voltage-converting function for electrically connecting a driving device to a load, the connector comprising:
    a voltage-converting module for performing voltage-conversion on a first voltage generated by the driving device and thereby generating a corresponding second voltage for driving the load, the voltage-converting module including:
        an input end for receiving the first voltage; and
        an output end for outputting the second voltage;
    a first connecting device disposed at a first side of the connector and connected to the input end of the voltage-converting module for accommodating the driving device and transmitting the first voltage; and
    a second connecting device disposed at a second side of the connector and connected to the input end of the voltage-converting module for accommodating the load and transmitting the second voltage to the load.

2. The connector of claim 1, wherein the voltage-converting module includes a step-up circuit.

3. The connector of claim 1, wherein the voltage-converting module includes a winding transformer or a piezoelectric transformer.

4. The connector of claim 1, wherein the first and second connecting devices include conductive material.

5. The connector of claim 1, wherein the first and second connecting devices include conductive clips.

6. A voltage converter for connecting a driving device to a load, comprising:
    a voltage-converting module for performing voltage-conversion on a first voltage generated by the driving device and thereby generating a corresponding second voltage for driving the load, the voltage-converting module including:
        an input end for receiving the first voltage; and
        an output end for outputting the second voltage; and
    a bobbin for containing the voltage-converting module and comprising:
        a first slot located at a first side of the voltage converter for allowing the driving device to be in contact with the input end of the voltage-converting module; and
        a second slot located at a second side of the voltage converter for allowing the load to be in contact with the output end of the voltage-converting module.

7. The voltage converter of claim 6, wherein the voltage-converting module includes a step-up circuit.

8. The voltage converter of claim 6, wherein the voltage-converting module includes a winding transformer or a piezoelectric transformer.

9. A backlight module comprising:
    an inverter for providing a first voltage;
    a lamp for providing light according to a second voltage; and
    a connector with voltage-converting function for electrically connecting the inverter to the lamp, the connector comprising:
        a voltage-converting module for performing voltage-conversion on the first voltage and thereby generating the corresponding second voltage for driving the lamp, the voltage-converting module including:
            an input end for receiving the first voltage; and
            an output end for outputting the second voltage;
        a first connecting device disposed at a first side of the connector and connected to the input end of the voltage-converting module and the inverter for accommodating the inverter and transmitting the first voltage; and
        a second connecting device disposed at a second side of the connector and connected to the output end of the voltage-converting module and the lamp for accommodating the lamp and transmitting the second voltage to the lamp.

10. The backlight module of claim 9, wherein the voltage-converting module includes a step-up circuit.

11. The backlight module of claim 9, wherein the voltage-converting module includes a winding transformer or a piezoelectric transformer.

12. The backlight module of claim 9, wherein the first and second connecting devices include conductive material.

13. The backlight module of claim 9, wherein the first and second connecting devices include conductive clips.

14. The backlight module of claim 9, wherein the lamp is a cold cathode fluorescent lamp (CCFL), an external electrode fluorescent lamp (EEFL), or a hot cathode fluorescent lamp (HCFL).

15. A backlight module comprising:
an inverter for providing a first voltage;
a lamp for providing light according to a second voltage; and
a voltage converter for connecting the inverter to the lamp, the voltage converter comprising:
  a voltage-converting module for performing voltage-conversion on the first voltage and thereby generating the corresponding second voltage for driving the lamp, the voltage-converting module including:
    an input end for receiving the first voltage; and
    an output end for outputting the second voltage; and
  a bobbin for containing the voltage-converting module and comprising:
    a first slot located at a first side of the voltage converter for allowing the inverter to be in contact with the input end of the voltage-converting module; and
    a second slot located at a second side of the voltage converter for allowing the lamp to be in contact with the output end of the voltage-converting module.

16. The backlight module of claim 15, wherein the voltage-converting module includes a step-up circuit.

17. The backlight module of claim 15, wherein the voltage-converting module includes a winding transformer or a piezoelectric transformer.

18. The backlight module of claim 15, wherein the lamp is a CCFL, an EEFL, or an HCFL.

* * * * *